Aug. 12, 1958  D. J. HANSEN ET AL  2,847,023
MEANS TO PREVENT OPERATION OF A TRUCK WHILE A TANK
THEREON IS IN FLUID COMMUNICATION
WITH ANOTHER TANK
Filed Aug. 3, 1955  2 Sheets-Sheet 1
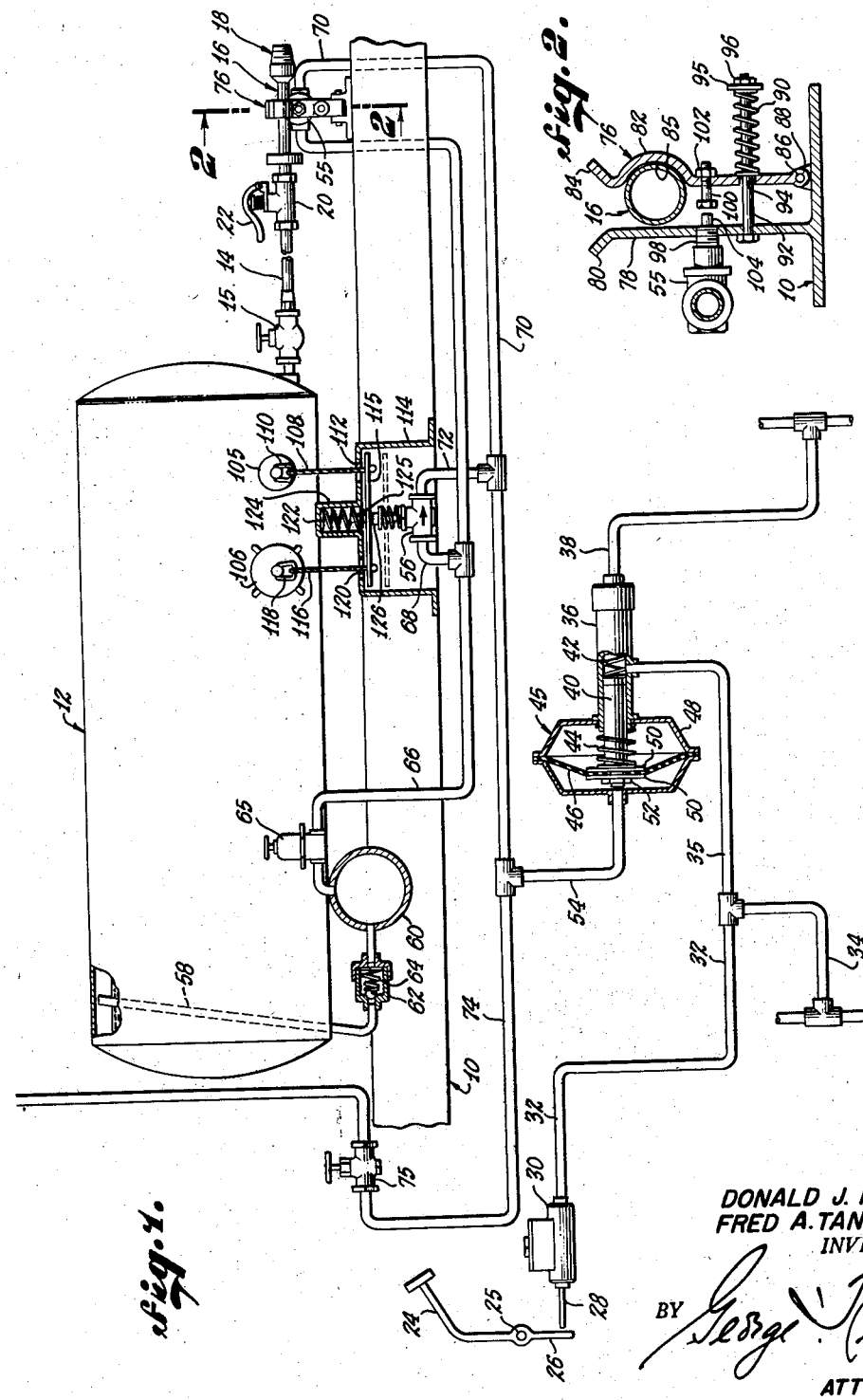
DONALD J. HANSEN &
FRED A. TANN,
    INVENTORS.
BY George V. Smyth
    ATTORNEY.

Aug. 12, 1958

D. J. HANSEN ET AL 2,847,023

MEANS TO PREVENT OPERATION OF A TRUCK WHILE A TANK
THEREON IS IN FLUID COMMUNICATION
WITH ANOTHER TANK

Filed Aug. 3, 1955

DONALD J. HANSEN &
FRED A. TANN,
INVENTORS.

BY George J. Smyth

ATTORNEY.

United States Patent Office 2,847,023
Patented Aug. 12, 1958

2,847,023

MEANS TO PREVENT OPERATION OF A TRUCK WHILE A TANK THEREON IS IN FLUID COMMUNICATION WITH ANOTHER TANK

Donald J. Hansen, Inglewood, and Fred A. Tann, Los Angeles, Calif., assignors to Equipment Manufacturing Company, Inc., Inglewood, Calif., a corporation of California Application August 3, 1955, Serial No. 526,194

17 Claims. (Cl. 137—351)

This invention relates to a tank truck for transporting fluids and is directed to means to prevent inadvertent operation of the truck while the tank on the truck is either connected with a source for replenishment or is connected to a stationary receptacle for transferring fluid thereto. While the invention is broadly applicable for its purpose, it is being initially applied to a tank truck for transporting a liquid petroleum gas such as butane under relatively high pressure. The disclosure herein of this particular practice of the invention will provide adequate guidance for those skilled in the art who may have occasion to apply the same principles to tank trucks used for other specific purposes.

When a tank truck stops to deliver a supply of butane to the tank of a dealer or consumer, a hose is extended from the tank on the truck to the stationary tank and a special nozzle fitting on the end of the hose is mechanically connected to the supply tank in a positive manner, for example by screw threads. If the tank truck operator forgets to disconnect the nozzle from the stationary tank and inadvertently starts up the tank truck while the hose is still connected, the inevitable result will be damage to the truck tank or to the hose or to the supply tank and since a highly inflammable pressurized fluid is involved, the hazard is extremely serious. Release of the pressurized fuel is likely to result in an intense fire, if not a violent explosion. The same hazard exists, of course, when the tank on the truck is connected to a fuel source for replenishment.

The present invention eliminates these hazards by providing means to immobilize the tank truck or to prevent operation of the truck so long as any such hose connection exists. In accord with this concept, the tank hose or preferably the nozzle on the hose has a normal transportation position on the truck and means responsive to removal of the hose or nozzle from this transportation position is automatically effective to prevent operation of the truck until the hose or nozzle is replaced in its normal transportation position. In the same way, the fill inlets of the tank on the truck have an operative state for connection to a fuel source to receive replenishing flow therefrom and have an alternate inoperative state at which the fill inlets cannot be connected to a fuel source. Means responsive to the operative state of any one of the refill inlets is effective automatically to prevent operation of the truck. In the preferred practice of the invention, closure caps are provided for the fill inlets of the tank and means responsive to removal of any of these closure caps is effective automatically to prevent operation of the truck.

In accord with the invention, operation of the truck is prevented by application of the truck brakes. With preference to using the truck brakes for this purpose, a special feature of the invention is the concept of using the pressure of the pressurized fuel itself to supply the required brake-actuating force.

To carry out this concept, a suitable fluid-pressure-actuated means such as a diaphragm or the like is adapted for applying the truck brakes and is supplied with fluid pressure from the tank on the truck through a pressure-reducing device and through a normally closed control valve. A suitable holder for the hose nozzle is provided on the truck and this holder is operatively associated with the control valve in such manner that removal of the hose nozzle from the holder causes the control valve to open for application of the truck brakes. For similar protection in the replenishing of the tank on the truck from a fuel source, a second control valve in parallel with the first mentioned control valve is operatively connected to the fill inlet caps in such manner that the removal of any one of the fill caps causes fluid pressure to be delivered to the diaphragm for actuation of the truck brakes.

A feature of the preferred practice of the invention is the concept of having the described safety system operate only the rear wheel brakes of the truck. Thus the safety system is independent of the brake pedal that is usually used to apply the brakes and any failure of the means to apply the rear wheel brakes will not interfere with normal operation of the brake system.

The features and advantages of the invention will be apparent from the following detailed description considered with the accompanying drawings.

In the drawings, which are to be regarded as merely illustrative:

Figure 1 is a diagram of one embodiment of the invention which provides for automatic application of the truck brakes whenever the hose nozzle is out of its normal position on the truck and whenever any one of the fill inlet caps is out of its normal closed position;

Figure 2 is a transverse section taken along the line 2—2 of Figure 1 showing the construction of the holder on the truck in which the hose nozzle is normally positioned;

Figure 3 is a diagrammatic view similar to Figure 1 showing a second embodiment of the invention incorporating electrical control circuits.

Figure 1 illustrating a selected embodiment of the invention shows the frame 10 of a truck that carries a tank 12 containing butane under high pressure. The tank has the usual dispensing hose 14 connected thereto by a cut-off valve 15. At the free end of the hose 14 is the usual nozzle fitting that is generally designated by numeral 16. The nozzle fitting may be of a well known construction with a screw-type head 18 at its outer end and with a manual dispensing valve 20 at its inner end. The dispensing valve is normally closed and may be opened by means of a handle 22 in opposition to spring pressure.

The truck has a well known type of hydraulic brake system which is controlled by a manual actuator in the form of the usual brake pedal 24. The brake pedal 24 is mounted on a suitable pivot 25 and has a downwardly extending arm 26 for movement against the operating plunger 28 of a brake cylinder 30.

The output side of the brake cylinder 30 is connected to the usual pipe or brake line 32 and this brake line has a branch 34 leading to the front wheel brakes for actuation thereof and has a second branch 35 which is connected to the side of an auxiliary brake cylinder 36. The output end of the auxiliary brake cylinder 36 is connected to a second brake line 38 that leads to the rear wheel brakes for actuation thereof.

An actuating plunger 40 in the auxiliary brake cylinder 36 is normally held in the retracted position shown in Figure 1 both by a spring 42 inside the auxiliary cylinder and by a second spring 44 outside of the auxiliary brake cylinder. At this retracted position of the actuating plunger 40, it clears the end of the branch 35 and thus places the first brake line 32 in communication with the second brake line 38 through the auxiliary brake cylinder. It is apparent, then, that when the actuating plunger 40 of the second auxiliary brake cylinder 36 is in its retracted position, the brake system of the truck operates in the usual manner under control of the brake pedal 24 to brake both the front wheels and the rear wheels. If the actuating plunger 40 is advanced in opposition to the two springs, however, it cuts off the brake line 32 and places the second brake line 38 under pressure to brake the rear wheels of the truck independently of the front wheels.

The actuating plunger 40 of the auxiliary brake cylinder 36 is part of a fluid-pressure-actuated means which is generally designated by the numeral 45 and which includes an actuating diaphragm 46. The diaphragm 46 spans the interior of a housing 48 and is attached to the actuating plunger 40 by a pair of large washers 50, the previously mentioned spring 44 pressing against one of the washers. The two washers 50 are held in place by a nut 52 that is threaded onto the reduced outer end of the actuating plunger 40.

The housing 48 is connected to a pipe 54 that receives fluid pressure from the butane tank 12 for actuation of the plunger 40 to the rear wheel brakes. It is contemplated that such fluid pressure will be effective whenever the nozzle fitting 16 is used to connect the butane tank 12 to a stationary tank apart from the truck and also whenever any one of the fill inlets of the butane tank 12 is connected to a butane source for replenishment of the supply in the tank. It will be apparent to those skilled in the art that various arrangements may be employed in various practices of the invention to supply fluid pressure to the pipe 54 automatically as required to carry out this basic purpose of the invention.

In the safety control system illustrated in Figure 1, fluid pressure is supplied to the fluid-pressure-actuated means 45 from the butane tank 12 either through a first normally closed control valve 55 or through a second normally closed control valve 56, these two valves being connected in parallel so that either valve may cause actuation of the diaphragm 46. The first control valve 55 opens in response to removal of the nozzle fitting 16 from its normal idle or transportation position on the truck and the second control valve 56 opens whenever a fill inlet of the butane tank 12 is exposed for connection to a source of butane.

In the particular arrangement shown in Figure 1, a pipe 58 in communication with the upper interior of the butane tank 12 is connected to a small auxiliary pressure tank 60 through a spring-loaded valve 62, the spring 64 of which maintains a predetermined pressure differential between the tank 12 and the auxiliary tank 60 for the purpose of maintaining a full head of vapor in the auxiliary pressure tank. The pressure in the auxiliary pressure tank 60 may, for example, normally be on the order of 60 p. s. i. The auxiliary pressure tank 60 is connected through a pressure regulator 65 with a pipe 66 that leads directly to the inlet side of the first control valve 55 and is also connected by a branch pipe 68 with the inlet side of the second control valve 56. A pipe 70 from the outlet side of the first control valve 55 and a branch pipe 72 from the outlet side of the second control valve 56 places the two control valves into communication with the previously mentioned pipe 54 that leads to the diaphragm housing 48. A pipe 74 connected both to the pipe 54 and to the pipe 70 leads to the atmosphere through a manually operable release valve 75 that is of restricted flow capacity. This release valve 75 is employed to bleed off fluid pressure to permit the diaphragm 46 and the actuating plunger 40 to retract for release of the rear wheel brakes when desired.

It is apparent that whenever either of the two control valves 55 and 56 is open, fluid under pressure from the butane tank 12 is directed against the diaphragm 46 to advance the actuating plunger 40 for application of the rear wheel brakes. After the rear wheel brakes have been applied in this manner, opening of the release valve 75 results in release of the rear wheel brakes providing both of the control valves 55 and 56 are closed. The flow capacity of either of the control valves 55 and 56 is so much greater than the restricted flow capacity of the release valve 75 that the release valve cannot vent fluid from the control system fast enough to cause retraction of the diaphragm 46 as long as either of the two control valves 55 and 56 is open.

When the hose 14 is out of use, it is contemplated that the nozzle fitting 16 will be gripped by a nozzle holder that is generally designated by numeral 76. As best shown in Figure 2, the nozzle holder 76 may comprise an upright fixed jaw member 78 on the truck frame 10, this jaw member having an outwardly turned lip 80. Adjacent the fixed jaw member 78 is a second upright jaw member having an outwardly turned lip 84 and formed with an off-set 85 to engage the nozzle fitting 16. This second jaw member 82 is mounted by a pivot 86 on a bracket 88, the bracket being in turn mounted on the truck frame 10.

The pivoted jaw 82 is urged towards the fixed jaw 78 by a suitable spring 90 on a bolt 92. The bolt 92 is fixedly mounted on the fixed jaw 78 and extends laterally through an aperture 94 in the pivoted jaw 82. The spring 90 encircles the bolt 92 in compression between the pivoted jaw 82 and a washer 95 which is retained by a nut 96 on the outer end of the bolt.

The previously mentioned first control valve 55 has screw threads 98 by means of which it is mounted on the fixed jaw 78 adjacent a screw 100. The screw 100 is adjustably threaded into the pivoted jaw 82 and is releasably secured at a selected position of adjustment by means of a lock nut 102. The normally open first control valve 55 has an operating plunger 104 that is in the path of the screw 100 when the pivoted jaw 82 swings towards the fixed jaw 78.

When the nozzle fitting 16 is gripped by the two jaws 78 and 82, as shown in Figure 2, the pivoted jaw 82 is held in a partially retracted position by the nozzle fitting and at this partially retracted position of the pivoted jaw, the screw 100 is out of operating contact with the operating plunger 104. When the nozzle fitting 16 is removed from the two jaws, however, the spring 90 swings the pivoted jaw 82 towards the fixed jaw 78 and thereby causes the screw 100 to depress the operating plunger 104 to open the first control valve 55.

The butane tank 12 has a fill inlet for vapor gas which is normally covered by a threaded cap 105 and has a second fill inlet for liquid that is normally covered by a second threaded cap 106. A short piece of cable 108 connected to the threaded cap 105 by a wire loop 110 extends through an aperture 112 in a housing 114 and is connected to one end of an operating bar 115 inside the housing. In like manner, a second cable 116 that is connected to the threaded cap 106 by a wire loop 118 extends through an aperture 120 in the housing 114 and is connected to the other end of the operating bar 115. Thus when both of the caps 105 and 106 are in their normal positions covering the two fill inlets of the butane tank 12, the two cables 108 and 116 hold the operating bar 115 by its opposite ends in a position close to the top wall of the housing 114.

A suitable coil spring 122 seated in a cylindrical chamber 124 at the top of the housing 114 encircles a boss 125 on the upper side of the operating bar 115 to exert downward pressure against the operating bar at an intermediate point thereof. The second control valve 56 is mounted in the housing 114 and has a spring-loaded operating plunger 126 immediately below the central portion of the operating bar 115. If either of the two threaded caps 105 and 106 is removed from the butane tank 12 thereby releasing either end of the operating bar 115, the spring 122 rocks the released end of the operating bar downward into actuating contact with the operating plunger 126 of the second control valve 56.

The manner in which the described embodiment of the invention operates for its purpose may be readily understood from the foregoing description. In the normal state of the equipment on the truck during the transportation of the butane in the tank 12, the diaphragm 46 is substantially free from pressure above normal atmospheric pressure and is in its relaxed retracted position shown in Figure 1, both of the two control valves 55 and 56 being closed at this time. The auxiliary pressure tank 60 is filled with butane vapor at a pressure which may be on the order of magnitude of 30 p. s. i., and the pressure regulator 65 maintains a lower pressure in the pipe 66 and 68 which may be on the order of 10 p. s. i.

In loading the butane tank 12 in preparation for a trip at least one of the two caps 105 or 106 is removed to permit the tank on the truck to be connected to a suitable butane source. The removal of either one of the two caps 105 and 106 permits the spring 122 to press the operating bar 115 down against the operating plunger 126 to open the control valve 56. Opening of the control valve 56 places the diaphragm housing 48 in communication with the pressure regulator 65 through pipes 66, 68, 72, 70 and 54. The fluid pressure exerted against the diaphragm 46 in this manner causes the diaphragm to be advanced against the opposition of the spring 42 and 44 thereby causing the actuating plunger 40 in the auxiliary brake cylinder 36 to be advanced for hydraulic actuation of the rear wheel brakes of the truck.

When the operating bar 115 is restored to its normal upper position by replacement of the removed filler cap 105 or 106, the control valve 56 closes to cut off communication between the diaphragm housing 48 and the auxiliary pressure tank 60. The operator may then release the rear wheel brakes simply by opening the release valve 75 to vent the diaphragm housing 48 to the atmosphere.

If either of the control valves 55 and 56 is open when the release valve 75 is opened by the operator, the rear wheel brakes will remain effective because the release valve 75 cannot bleed off the pressurized gas at a sufficient rate to cause an effective pressure drop in the diaphragm housing 48. In like manner, if the operator inadvertently fails to close the release valve 75 after he starts up the truck, the safety system will still remain operative for its purpose because as soon as either of the control valves 55 or 56 is opened it admits fluid to the diaphragm housing at a sufficiently high rate to cause the rear wheel brake to be applied even though a portion of the pressurized gas is vented to the atmosphere by the release valve.

When the truck stops to make a delivery of butane from the tank 12, the removal of the nozzle fitting 16 from the holder 78 causes the control valve 55 to open for application of the rear wheel brakes in the same manner as described above. The opening of the control valve 55 is caused by the swinging movement of the pivoted jaw 82 under the pressure of the spring 90 when the nozzle fitting 16 is removed from the holder 76. This swinging movement of the jaw 82 carries the screw 100 against the operating plunger 104 to open the control valve 55.

It is to be noted that when the actuating plunger 40 is in its normal retracted position shown in Figure 1, the brake line 38 for the rear wheels brakes is in communication with the brake line 32 for the front wheel brakes so that operation of the brake pedal 24 results in application of both the front wheel brakes and the rear wheel brakes. If the actuating plunger 40 fails to retract sufficiently to place the brake line 38 in communication with the brake line 32, the brake pedal 24 will still be effective for braking the truck since it maintains control over the front wheel brakes.

The second form of the invention shown in Figure 3 is similar in many respects to the first described form, as indicated by the use of corresponding numerals to indicate corresponding parts. Thus the hydraulic brake system of the truck is arranged in the manner heretofore described for actuation of both the front wheel brakes 128 and the rear wheel brakes 130 by the brake pedal 24 during normal operation of the truck, and for actuation of the rear wheel brakes 130 by the fluid-pressure-actuated means 45 when the butane tank 12 is connected either to a fuel source or to the stationary tank of a dealer or consumer.

In this second form of the invention, a high-pressure pipe 132 is connected directly to the top of the butane tank 12 and is provided with a normally closed control valve 134 that is of the solenoid type for control by an electric circuit. The pipe 132 is connected to a pipe 135 that leads to the diaphragm housing 48 and is also connected to a pipe 136 that leads to the atmosphere, this pipe 136 being provided with a release valve 138 that is also of the solenoid type.

The circuit for opening the normally closed control valve 134 includes three switches in parallel, namely, a switch 140 that is biased to close but is normally held open by the fill cap 105, a switch 142 that is also biased to close but is normally held open by the second fill cap 106, and a normally open switch 144 that is adapted to close automatically whenever the nozzle fitting 16 is removed from a holder 76a.

The switch 140 is connected to the fill cap 105 by a coiled spring 145 and in like manner the switch 142 is connected to the fill cap 106 by a second coiled spring 146. When these two caps 105 and 106 are in their normal positions concealing the two fill inlets of the butane tank, the two springs 145 and 146 are stressed in tension to hold the two switches 140 and 142 open.

The holder 76a for the nozzle fitting 16 is of the same general construction as heretofore described, but in this instance the pivoted jaw 82 carries a long screw 146 that extends through an aperture in the fixed jaw 78 in the region of the switch 144. When the nozzle fitting 16 is removed from the holder 76a, the screw 146 automatically closes the switch 144.

The wiring circuit for the control valve 134 includes the usual grounded battery 148 of the truck. A wire 150 connects the battery to one side of the switch 144 and two wires 152 and 154 branching from the wire 150 are connected to one side of switch 140 and one side of switch 142, respectively. A wire 155 connects the second side of each of the three switches with the actuating coil 156 of the solenoid valve 134, the second side of the actuating coil being grounded.

The circuit for energizing the release valve 138 includes a wire 158 that connects the previously mentioned wire 150 to one side of a release switch 160 in the cab of the truck. The second side of the release switch 160 is connected by a wire 162 to one side of the actuating coil 164 of the release valve 138, the second side of this actuating coil being grounded.

The manner in which this second embodiment of the invention operates may be readily understood. It is apparent that when the two fill caps 105 and 106 are in their normal positions on the tank 12 and when the nozzle fitting 16 is in the holder 76a, all three of the switches 140, 142, and 144 are open with the solenoid coil 156 deenergized and the control valve 134 in its normal closed position.

If either of the fill caps 105 and 106 is removed from its normal closed position, the solenoid coil 156 will be energized to open the valve 134. Opening of the valve 134 places the diaphragm housing 48 in direct communication with butane tank 12 to cause the diaphragm to be actuated for applying the rear wheel brakes 130. In like manner, removal of the nozzle fitting 16 from the holder 76a causes the screw 146 to close the valve 144 for application of the rear wheel brakes of the truck.

When the rear wheel brakes of the truck have been applied in this manner, the rear wheel brakes will remain effective so long as any one of the three switches 140, 142, and 144 is closed. When all three of these switches are open, however, the rear wheel brakes may be released simply by closing the release switch 160 in the truck cab to open the release valve 138. The flow capacity of the release valve 138 is so restricted relative to the flow capacity of the control valve 134 that the release valve is ineffective for releasing the rear wheel brakes as long as the control valve 134 is open.

Although the now preferred embodiments of the present invention have been shown and described herein, it is to be understood that the invention is not to be limited thereto, for it is susceptible to changes in form and detail within the scope of the appended claims.

We claim:

1. In a tank truck having a dispensing hose with a nozzle thereon and having a fill inlet, said inlet being provided with means normally positioned to prevent connection of the inlet to a fluid source, said preventing means being removable to permit such connection, the combination therewith of means to preclude operation of the truck when said nozzle is connetced to a second tank or when said fill inlet is connected to a fluid source, said precluding means comprising: a holder on the truck to carry said nozzle when the nozzle is out of use; and means responsive to movement of said nozzle into and out of said holder and responsive to said preventing means to prevent operation of the truck if the nozzle is out of the holder or if said preventing means is removed from its normal position.

2. A combination as set forth in claim 1 in which said responsive means applies the brakes of the truck to preclude operation of the truck.

3. In a truck having a tank, a dispensing hose connected to the tank, and a nozzle at the end of the hose to connect the hose to a second tank apart from the truck, the combination therewith of means to prevent operation of the truck while said hose is connected to a second tank, said means comprising: a holder on the truck for said nozzle; sensing means responsive to movement of the nozzle into and out of said holder, said sensing means taking a first position in response to movement of the nozzle into the holder and into a second position in response to movement of the nozzle out of the holder, and means to immobilize the truck in response to movement of said sensing means from said first position to said second position.

4. A combination as set forth in claim 3 in which means to prevent operation of the truck applies the brakes of the truck in response to movement of said sensing means from its first position to its second position.

5. In a truck having a tank with an inlet, the combination therewith of means to prevent operation of the truck while said inlet is connected to fluid source for filling the tank, said means comprising: a member retractable from a position on the tank at said inlet to prevent use of the inlet; and means responsive to the retraction of said member from said position to prevent operation of the truck.

6. A combination as set forth in claim 5 in which said means to prevent operation of the truck comprises means to apply the brakes of the truck.

7. In a brake-equipped truck having a tank thereon for pressurized fluid, a dispensing hose connected to the tank and a nozzle on the end of the hose for connecting the hose to a second tank apart from the truck, the combination therewith of means to immobilize said truck while said hose in in use, said means comprising: a fluid-pressure-actuated means to apply the brakes of the truck; means including a normally closed control valve to place said fluid-pressure-actuated means in communication with the tank to receive fluid pressure therefrom; and means to open said control valve for actuation of the truck brakes in response to removal of said nozzle from a normal idle position on the truck.

8. A combination as set forth in claim 7 which includes a normally closed release valve to release fluid pressure from said fluid-pressure-actuated means thereby to release the truck brakes, the flow capacity of said release valve being restricted relative to the flow capacity of said control valve to prevent release of the brakes so long as the control valve is open.

9. A combination as set forth in claim 7 in which said fluid-pressure-actuated means is operatively connected to the rear wheel brakes only of the brake system, the front wheel brakes being operable independently of the fluid-pressure-actuated means.

10. A combination as set forth in claim 9 in which the truck has a hydraulic brake system with a manual actuator; and in which said rear wheel brakes are normally operatively connected with said manual actuator through said fluid-pressure-actuated means, said fluid-pressure-actuated means having a normal inoperative position at which it permits free flow of brake fluid between the manual actuator and the rear wheel brakes, said fluid-pressure-actuator having a brake-applying position at which it cuts off flow of brake fluid between the manual actuator and the rear wheel brakes.

11. A combination as set forth in claim 7 which includes spring means to normally hold said fluid-pressure-actuated means in its operative position.

12. A combination as set forth in claim 7 which includes: a control circuit; means energized by said control circuit to open said control valve; and a switch to close said control circuit in response to removal of said nozzle from its normal idle position on the truck.

13. A combination as set forth in claim 7 which includes means to grip said nozzle at said idle position on the truck; and includes means to open said valve in response to the closing action of said grip means in the absence of the nozzle.

14. A combination as set forth in claim 13 which includes a jaw member; spring means to urge said jaw member to closed position whereby said nozzle normally holds said jaw member in retracted position; and means to open said normally closed valve in response to movement of said jaw means to said closed position.

15. In a brake-equipped truck having a tank for transportation of pressurized fluid, with a fill inlet in the tank; the combination therewith of means to immobilize a truck while said fill inlet is connected to a fuel source for filling the tank, said means comprising: fluid-pressure-actuated means to apply the brakes of the truck; a member at said fill inlet of the tank, said member being movable between a first position effective to prevent connection of the inlet with a source and a second retracted position to make the fill inlet accessible for a connection; means including a normally closed control valve to place said fluid-pressure-actuated means in communication with the tank to receive actuating pressure therefrom; and means to open said control valve to actuate the truck brakes in response to movement of said member from its first position to its second position.

16. A combination as set forth in claim 15 in which said fluid-pressure-actuated means is operatively connected to the rear wheel brakes only of the brake system of the truck to operate the rear wheel brakes independently of the front wheel brakes.

17. A combination as set forth in claim 15 which includes: a control circuit; means energized by said control circuit to open said control valve; and a switch to close said control circuit in response to movement of said member from its first position to its second position.

(References on following page)

References Cited in the file of this patent

UNITED STATES PATENTS

| | | |
|---|---|---|
| 113,786 | Numler | Apr. 18, 1871 |
| 1,343,072 | Ackroyd | June 8, 1920 |
| 1,738,701 | Hanna | Dec. 10, 1929 |
| 1,801,749 | McEachern | Apr. 21, 1931 |
| 1,884,673 | Hayes | Oct. 25, 1932 |
| 2,002,757 | Shand | May 28, 1935 |
| 2,211,699 | Lear | Aug. 13, 1940 |
| 2,707,577 | Trotter | May 3, 1955 |